(12) United States Patent
Ando et al.

(10) Patent No.: US 11,448,588 B2
(45) Date of Patent: Sep. 20, 2022

(54) ANALYZER, ANALYSIS METHOD, ANALYZER PROGRAM, AND ANALYSIS LEARNING DEVICE

(71) Applicant: HORIBA, LTD., Kyoto (JP)

(72) Inventors: Yoshitake Ando, Kyoto (JP); Masayuki Adachi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 337 days.

(21) Appl. No.: 16/492,529

(22) PCT Filed: Aug. 1, 2018

(86) PCT No.: PCT/JP2018/028812
§ 371 (c)(1),
(2) Date: Sep. 9, 2019

(87) PCT Pub. No.: WO2019/031331
PCT Pub. Date: Feb. 14, 2019

(65) Prior Publication Data
US 2021/0140877 A1    May 13, 2021

(30) Foreign Application Priority Data
Aug. 7, 2017   (JP) .............................. JP2017-152787

(51) Int. Cl.
*G01N 21/3504*   (2014.01)
*G01N 21/35*   (2014.01)

(52) U.S. Cl.
CPC . *G01N 21/3504* (2013.01); *G01N 2021/3595* (2013.01); *G01N 2201/1293* (2013.01)

(58) Field of Classification Search
CPC .................. G01N 21/3504; G01N 21/255
See application file for complete search history.

(56) References Cited

U.S. PATENT DOCUMENTS

| | | | |
|---|---|---|---|
| 11,099,124 B2* | 8/2021 | Takahashi | G01N 21/274 |
| 2004/0064243 A1 | 4/2004 | Nakamura | |
| 2007/0082407 A1 | 4/2007 | Little, III | |
| 2009/0197340 A1 | 8/2009 | Chesneau | |
| 2019/0017927 A1* | 1/2019 | Takahashi | G01N 21/255 |

FOREIGN PATENT DOCUMENTS

| | | |
|---|---|---|
| JP | 04-265842 A | 9/1992 |
| JP | 08-029332 A | 2/1996 |
| JP | 09-101259 A | 4/1997 |

(Continued)

OTHER PUBLICATIONS

International Search Report dated Oct. 30, 2018 issued for International Application No. PCT/JP2018/028812, 4 pgs.

(Continued)

*Primary Examiner* — Bryan Bui
(74) *Attorney, Agent, or Firm* — Brooks Kushman P.C.

(57) ABSTRACT

An analyzer that analyzes a measurement sample on the basis of spectrum data obtained by irradiating the measurement sample with light and includes a total analysis value calculation part that, on the basis of the total analysis value of a reference sample of which the total analysis value of multiple predetermined components are preliminarily obtained, calculates the total analysis value of the multiple components in the measurement sample from the spectrum data of the measurement sample.

15 Claims, 5 Drawing Sheets

(56) References Cited

FOREIGN PATENT DOCUMENTS

| | | |
|---|---|---|
| JP | 11-037935 A | 2/1999 |
| JP | 2000-346801 A | 12/2000 |
| JP | 2001-066251 A | 3/2001 |
| JP | 2003-014627 A | 1/2003 |
| JP | 2004-117259 A | 4/2004 |
| JP | 2005-257676 A | 9/2005 |
| JP | 2010-210360 A | 9/2010 |
| JP | 2011-122950 A | 6/2011 |
| JP | 2013-130488 A | 7/2013 |
| WO | 1992-007326 A1 | 4/1992 |
| WO | 2016-003877 A1 | 1/2016 |

OTHER PUBLICATIONS

Arrigone G M et al: "Theory and practice in using Fourier transform infrared spectroscopy to detect hydrocarbons in emissions from gas turbine engines", Fuel, IPC Science and Technology Press, Guildford, GB, vol. 84, No. 9, Jun. 1, 2005 (Jun. 1, 2005), pp. 1052-1058, XP027700369.

EESR dated Apr. 6, 2021 issued in EP patent application No. 18844274.3, 11 pgs.

\* cited by examiner

ANALYZER, ANALYSIS METHOD, ANALYZER PROGRAM, AND ANALYSIS LEARNING DEVICE

CROSS-REFERENCE TO RELATED APPLICATION

This application is the U.S. national phase of PCT Application No. PCT/JP2018/028812, filed Aug. 1, 2018, which claims priority to Japanese Patent Application No. 2017-152787, filed Aug. 7, 2017, which are both incorporated by reference herein in their entireties.

TECHNICAL FIELD

The present invention relates to an analyzer that analyzes a measurement sample on the basis of spectrum data obtained by irradiating the measurement sample with light.

BACKGROUND ART

In the past, for example, to measure the concentration and/or amount of total hydrocarbons (THC) contained in exhaust gas of a vehicle, an FID (Flame Ionization Detector) analyzer and a spectroscopic analyzer such as an FTIR have been used.

However, the FID analyzer is superior in analysis accuracy, but has problems such as the difficulty in handling and an increase in running cost because hydrogen gas ($H_2$) as supporting gas and helium gas (He) used for concentration adjustment of it or the like have to be supplied.

On the other hand, the FTIR analyzer has advantages of easier handling and low running cost, but is problematic in analysis accuracy. That is, in the FTIR analyzer, a two-step calculation that individually obtains the concentrations of respective hydrocarbons (HC) from a light spectrum and then weights and sums up them is performed, and errors probably occurring when setting weighting factors are superimposed on errors probably occurring when measuring the concentrations of respective HC, thus making it very difficult to improve measurement accuracy.

For example, the THC concentration of exhaust gas of a vehicle is typically 100 ppmC or less; however, the concentration accuracy of each HC obtained by the FTIR spectroscopic analyzer is at most approximately 1 to 10 ppm, and from these pieces of information, it is difficult to perform measurement with sufficient accuracy. Also, it cannot be assured whether respective HC components whose concentrations are quantified by the FTIR spectroscopic analyzer include all types of HC components, and therefore this also serves as a factor preventing an increase in THC measurement accuracy.

Besides, for example, in Patent Literature 1, there is one adapted to, in order to avoid individual measurement, regard some multiple types of HC contained in a measurement sample as producing the spectrum of a single component as one compound, and from the spectrum, collectively quantify and measure the total amount of it.

CITATION LIST

Patent Literature

Patent Literature 1
  Japanese Unexamined Patent Publication JP-A4-265842

SUMMARY OF INVENTION

Technical Problem

Therefore, the main desired object of the present invention is to dramatically improve the measurement accuracy of an analyzer such as an FTIR spectroscopic analyzer.

Solution to Problem

That is, the analyzer according to the present invention is one that analyzes a measurement sample on the basis of spectrum data obtained by irradiating the measurement sample with light, and includes a total analysis value calculation part that, on the basis of the total analysis value of a reference sample of which the total analysis value of multiple predetermined components are preliminarily obtained, calculates the total analysis value of the multiple components in the measurement sample from the spectrum data of the measurement sample.

Also, the total analysis value calculation part may be one that analyzes a measurement sample on the basis of spectrum data obtained by irradiating the measurement sample with light, and on the basis of the spectrum data of a reference sample of which the total analysis value of multiple predetermined components are preliminarily obtained, calculates the total analysis value of the multiple components in the measurement sample from the spectrum data of the measurement sample.

In addition, spectrum data is one that, in addition to the spectrum data of the light transmitted through, reflected by, or scattered by the measurement sample (or the reference sample), also includes the spectrum data (absorption spectrum data) of the light absorbed by the measurement sample (or the reference sample) and corrected absorption spectrum data in which the influence of an interference component contained in the measurement sample (or the reference sample) is reduced or removed.

Also, a total analysis value refers to the total value of physical quantities of multiple respective components, such as the total value of concentrations of multiple components or the total value of masses.

In such a configuration, in addition to calculating the total analysis value of the multiple components contained in the measurement sample with, as a reference, data related to the reference sample of which the total analysis value and the spectrum data are known, the total analysis value can be directly calculated from the spectrum data of the measurement sample, and therefore an error caused by intermediate calculation such as calculating the analysis value of an individual component from spectrum data as conventional can be eliminated to dramatically improve analysis accuracy.

Also, it is not necessary to use difficult-to-handle gases such as supporting gas ($H_2$), thus making it possible to make contributions in terms of convenience and running cost as well.

More specifically, it can be cited that the total analysis value calculation part is one including: a correlation data storage part that stores data indicating the correlation between the spectrum data of the reference sample and the total analysis value of the reference sample; and a calculation main body part that applies the correlation in the correlation data storage part to the spectrum data of the measurement sample to calculate the total analysis value of the multiple components in the measurement sample.

In this case, it is only necessary that the total analysis value calculation part is configured to, on the basis of the spectrum data of the reference sample and the total analysis value of the reference sample, calculate the correlation between the spectrum data and the total analysis value to store it in the correlation data storage part.

In order to further contribute to improving the analysis accuracy, it is preferable that acquisition is performed by another analyzer capable of accurately measuring the total analysis value of the reference sample.

That is, it is preferable that a reception part that receives data indicating the total analysis value of the reference sample, which is measured by one other type of analyzer, is further included, and a correlation calculation part calculates the correlation on the basis of the total analysis value received by the reception part and the spectrum data of the reference sample obtained by the present analyzer.

In order to directly obtain a correlation from spectrum data to a total analysis value, it is preferable to use machine learning or deep learning.

In this case, the accuracy of the calculated correlation increases as the number of pieces of training data is increased. Accordingly, it is desirable that the correlation calculation part is one configured to calculate the correlation from the respective total analysis values and respective pieces of spectrum data of multiple mutually different reference samples.

Also, in order to more improve correlation accuracy as the period of use becomes longer, it is only necessary that the correlation calculation part is configured to, when the total analysis value of a new reference sample and its spectrum data are acquired, take into account the total analysis value of the new reference sample and its spectrum data to update the correlation.

As another embodiment for improving the correlation accuracy, it is desirable that the correlation calculation part is one that calculates the correlation with the temperature and/or pressure of the reference sample as parameters as well, and the calculation main body part is one that calculates the total analysis value of the measurement sample on the basis of the correlation specified with the temperature and/or pressure of the measurement sample as parameters.

In order to further improve the analysis accuracy of multiple components, it is preferable that the spectrum data is one in which the influence of another component interfering with the multiple components is reduced or removed.

In order to calculate the total analysis value of components obtained by subtracting one or more arbitrary components from the multiple components, it is only necessary to further include a main analysis part that analyzes an individual single component contained in the measurement sample on the basis of the spectrum data obtained by irradiating the measurement sample with the light.

For example, in the case of HC, for HC whose molecular weights are small, analysis values such as concentrations can be accurately obtained even by, for example, a conventional FTIR analyzer; however, for HC whose molecular weights are large, the separation of spectrum data is difficult, and analysis accuracy is deteriorated. For this reason, it is allowed that HC whose molecular weights are small are analyzed by an FTIR analyzer, from which the spectrum data of the HC whose molecular weights are small is obtained and subtracted from original spectrum data for correction, and from corrected spectrum, HC whose molecular weights are large is analyzed.

As a specific embodiment by which the effect of the present invention is remarkably produced, one in which the measurement sample or the reference sample is exhaust gas of a vehicle, and the components to be analyzed are hydrocarbons (HC) can be cited. Also, one in which the total analysis value of the multiple predetermined components is THC concentration can be cited.

Further, the present analyzer is preferably one of an FTIR type, and in the case of THC analysis, the one other type of analyzer is preferably an FID analyzer.

An analysis learning device dedicated to a function of calculating only a correlation using only a reference sample is also one aspect of the present invention.

In this case, one including: a reception part that receives spectrum data obtained by irradiating with light a reference sample of which the total analysis value of multiple predetermined components are preliminarily obtained; a reference sample data storage part that stores the total analysis values and pieces of spectrum data of multiple mutually different reference samples; and a correlation calculation part that refers to the reference sample data storage part to calculate a correlation common between the pieces of spectrum data and the total analysis values of the respective reference samples is preferable.

Advantageous Effects of Invention

According to the present invention configured as described, in addition to analyzing the measurement sample using the data related to the reference sample of which the total analysis value and spectrum data are known, an error caused by intermediate calculation such as calculating the analysis value of an individual component from spectrum data as conventional can be eliminated, and therefore analysis accuracy can be dramatically improved. Also, it is not necessary to use difficult-to-handle gases such as supporting gas ($H_2$), thus making it possible to make contributions in terms of convenience and running cost as well.

REFERENCE SIGNS LIST

100 Analyzer
51 Main analysis part
52 Total analysis value calculation part
521 Correlation calculation part
522 Calculation main body part
53 Reception part

DESCRIPTION OF EMBODIMENTS

In the following, an analyzer 100 according to one embodiment of the present invention will be described with reference to drawings.

The analyzer 100 of the present embodiment is one constituting part of an exhaust gas measurement system 200.

Figure 1:
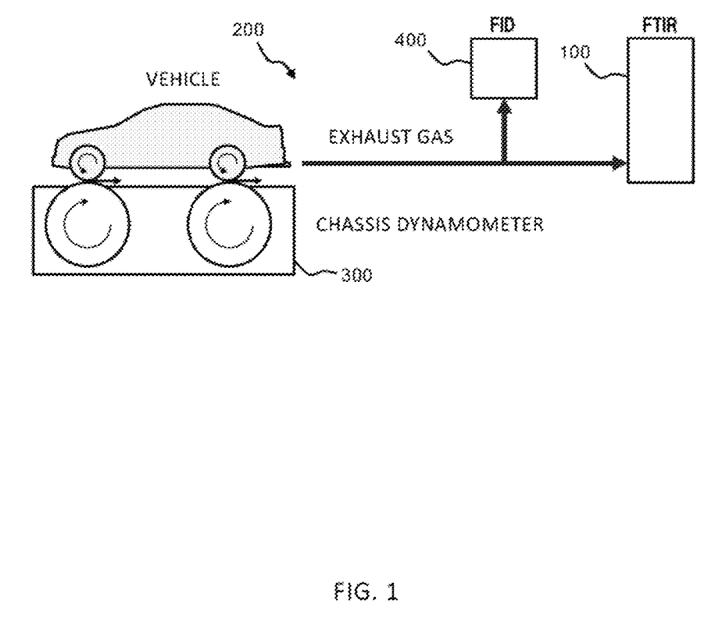
FIG. 1 is an overall diagram of an exhaust gas measurement system including an analyzer in one embodiment of the present invention.

As illustrated in FIG. 1, the exhaust gas measurement system 200 includes a chassis dynamometer 300, an FID analyzer 400, and the present analyzer 100.

Figure 2:
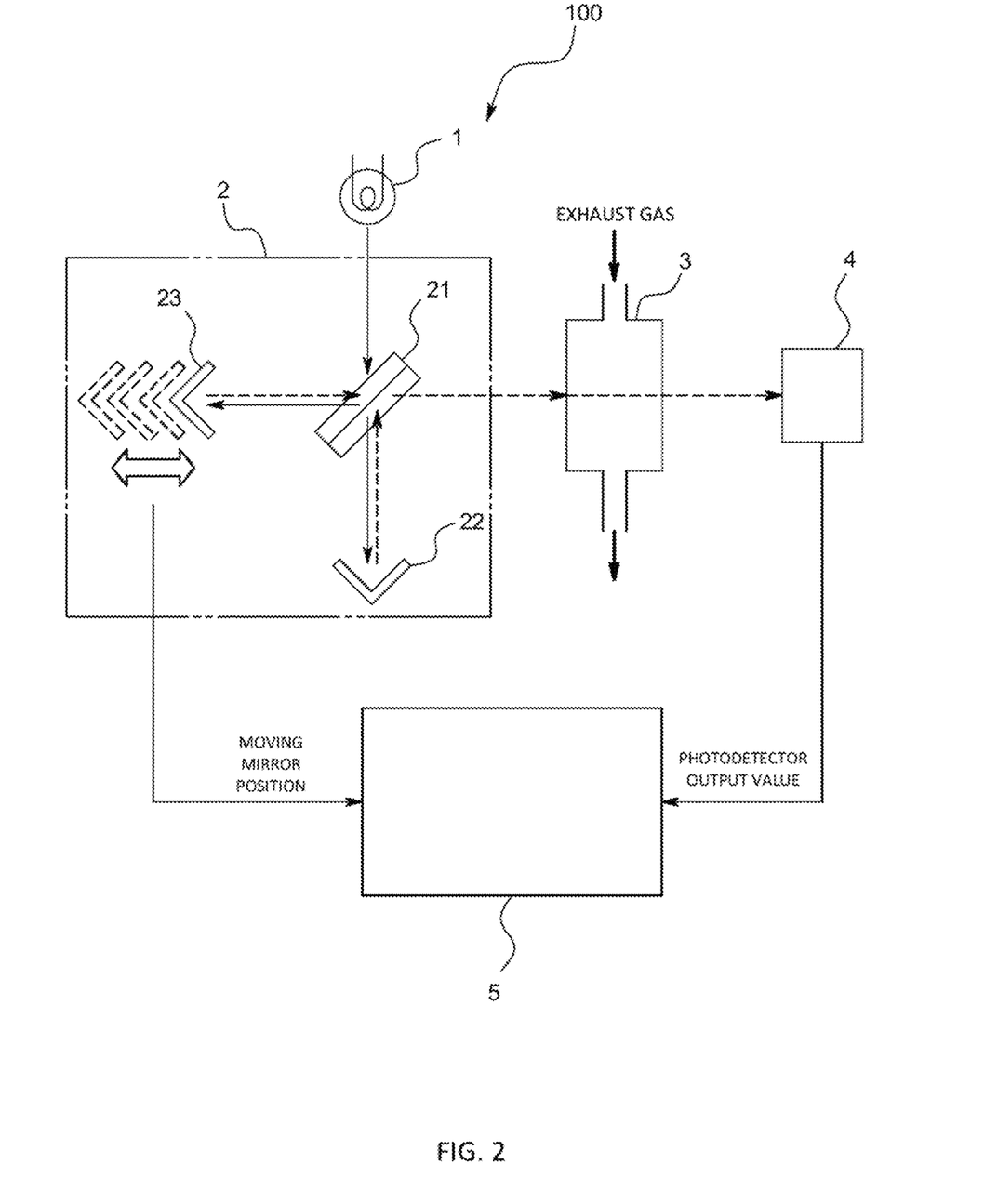
FIG. 2 is a schematic diagram illustrating the whole of the analyzer in the same embodiment.

In addition, as illustrated in FIG. 2, the present analyzer 100 is a Fourier transform infrared spectroscopic analyzer referred to as a so-called FTIR including a light source 1, interferometer (spectroscopic part) 2, sample cell 3, photodetector 4, arithmetic processing unit 5, and the like. The analyzer 100 (hereinafter also referred to as an FTIR analyzer 100 for distinction) is used as an exhaust gas analyzer that measures the THC concentration (or amount) of exhaust gas as a measurement sample.

The light source 1 is one that emits light having a broad spectrum (continuous light including lights having many wavenumbers), and for example, a tungsten iodine lamp, or a high-intensity ceramic light source is used.

As illustrated in the same drawing, the interferometer 2 is one using a so-called Michelson interferometer including one half-mirror (beam splitter) 21, a fixed mirror 22, and a moving mirror 23. The light from the light source 1 incident on the interferometer 2 is split into reflected light and transmitted light by the half-mirror 21. One of the lights is reflected by the fixed mirror 22, and the other one is reflected by the moving mirror 23 to return to the half-mirror 21 again, combined, and emitted from the interferometer 2.

The sample cell 3 is a transparent cell into which the exhaust gas as the measurement sample is introduced, and adapted so that the light emitted from the interferometer 2 is transmitted through the measurement sample in the sample cell 3 and led to the photodetector 4.

Here, the photodetector 4 is one referred to as a so-called an MCT photodetector 4.

The arithmetic processing unit 5 is one including: an analog electric circuit having a buffer, an amplifier, and the like; a digital electric circuit having a CPU, a memory, a DSP, and the like; and an A/D converter and the like interposing between them.

Figure 3:
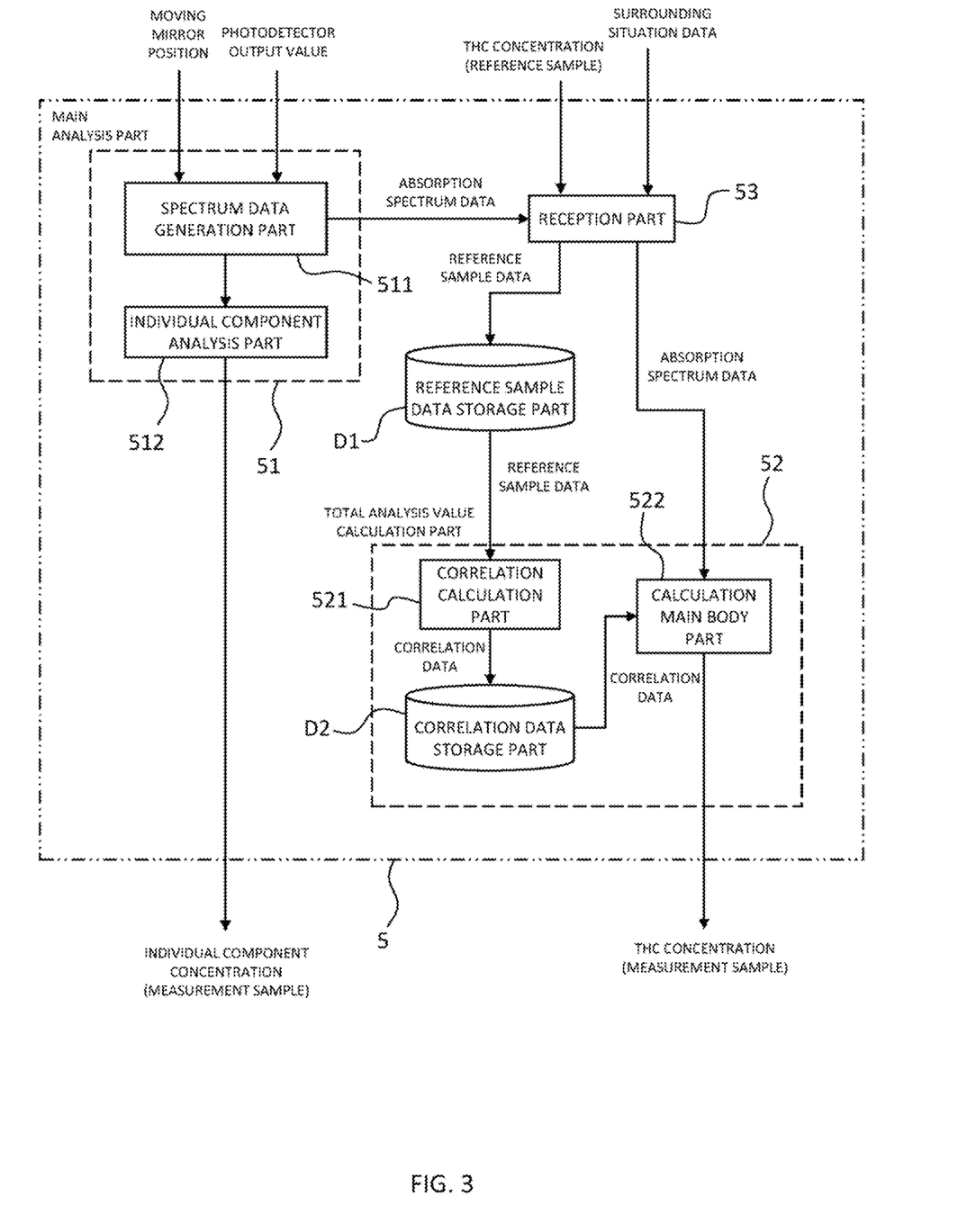
FIG. 3 is a functional block diagram of an arithmetic processing unit in the same embodiment.

The CPU and its peripheral devices cooperate in accordance with a predetermined program stored in the memory, and thereby as illustrated in FIG. 3, the arithmetic processing unit 5 fulfills a function as a main analysis part 51 that, from output values of the photodetector 4, calculates transmitted light spectrum data indicating the spectrum of the light transmitted through the sample, as well as calculates absorption spectrum data from the transmitted light spectrum data to specify various components contained in the measurement sample, and calculates the concentrations (or amounts) of the respective components.

The main analysis part 51 includes a spectrum data generation part 511 and an individual component analysis part 512.

When while advancing/retreating the moving mirror 23, observing the intensity of the light transmitted through the sample with the position of the moving mirror 23 taken as a horizontal axis, in the case of light having a single wavenumber, the light intensity draws a sine curve due to interference. On the other hand, since the actual light transmitted through the sample is the continuous light and the sine curve is different for each of the wavelengths, the actual light intensity exhibits the superposition of sine curves drawn at the respective wavenumbers, and an interference pattern (interferogram) is of a wave packet shape.

The spectrum data generation part 511 obtains the position of the moving mirror 23 by, for example, an unillustrated range finder (not illustrated) such as a He—Ne laser, as well as obtains light intensity at each position of the moving mirror 23 by the photodetector 4, and performs fast Fourier transform (FFT) of an interference pattern obtained from them to thereby transform to the transmitted light spectrum data with each wavenumber component as the horizontal axis. In addition, for example, on the basis of transmitted light spectrum data preliminarily measured with the sample cell empty, the transmitted light spectrum data of the measurement sample is further transformed to the absorption spectrum data.

The individual component analysis part 512 specifies the various components contained in the measurement sample from, for example, respective peak positions (wavenumbers) and corresponding heights of the absorption spectrum data, and calculates the concentrations (or amounts) of the respective components.

Further, in the present embodiment, as illustrated in FIG. 3, in order to make it possible to accurately measure the THC concentration (or amount) of the exhaust gas as the measurement sample, the arithmetic processing unit 5 is further provided with functions as a reception part 53, a total analysis value calculation part 52, and the like.

The reception part 53 is one that receives the THC concentration of the exhaust gas measured by the FID analyzer 400. Exhaust gas whose THC concentration measured by the FID analyzer 400 is known is hereinafter referred to as a reference sample.

Incidentally, the reference sample is also introduced into the present FTIR analyzer 100 as well as the FID analyzer 400, and absorption spectrum data of it is also acquired by the main analysis part 51, so that the reception part 53 also receives the absorption spectrum data of the reference sample as intermediate information calculated by the main analysis part 51, links this to the THC concentration of the reference sample measured by the FID analyzer 400 as reference sample data, and stores this in a reference sample data storage part D1 set in a predetermined area of the memory.

Further, the present embodiment is adapted to be able to acquire surrounding situation data including at least the temperature and pressure of the reference sample through input by an unillustrated sensor or operator provided in the present system, and the reception part 53 is configured to acquire the surrounding situation data of the reference sample to attach it to the reference sample data, and store it in the reference sample data storage part D1.

The total analysis value calculation part 52 is one that calculates the concentration of THC in the measurement sample from the absorption spectrum data of the measurement sample (exhaust gas) with the reference sample data as training data, and more specifically includes a correlation calculation part 521 and a calculation main body part 522. In addition, the THC corresponds to multiple components in claims, and the THC concentration corresponds to a total analysis value in claims.

The correlation calculation part 521 is one that refers to multiple pieces of reference sample data stored in the reference sample data storage part D1, and calculates the correlation between absorption spectrum data and THC concentration, which is common to those pieces of reference sample data, by machine learning (artificial intelligence, deep learning, or the like). Correlation data indicating the calculated correlation is stored in a correlation data storage part D2 set in a predetermined area of the memory.

In addition, in the correlation calculation part 521, every time reference sample data is added, learning is repeated to update the correlation, and therefore as the number of pieces of reference sample data is increases, the accuracy of the correlation is more improved.

Also, the correlation calculation part 521 in the present embodiment is configured to calculate the correlation with the surrounding situation data of the reference sample also as a parameter, i.e., configured so that the correlation also changes depending on the temperature, pressure, or the like of the reference sample; however, to calculate the correlation, it is not necessary to refer to the surrounding situation data.

The calculation main body part 522 is one that applies the correlation calculated by the correlation calculation part 521 to the spectrum data of the measurement sample and calculates the THC concentration of the measurement sample. At this time, since the reception part 53 is adapted to acquire the surrounding situation data of the measurement sample, the calculation main body part 522 is adapted to apply the correlation corresponding to the surrounding data of the measurement sample when calculating the THC concentration.

Figure 4:
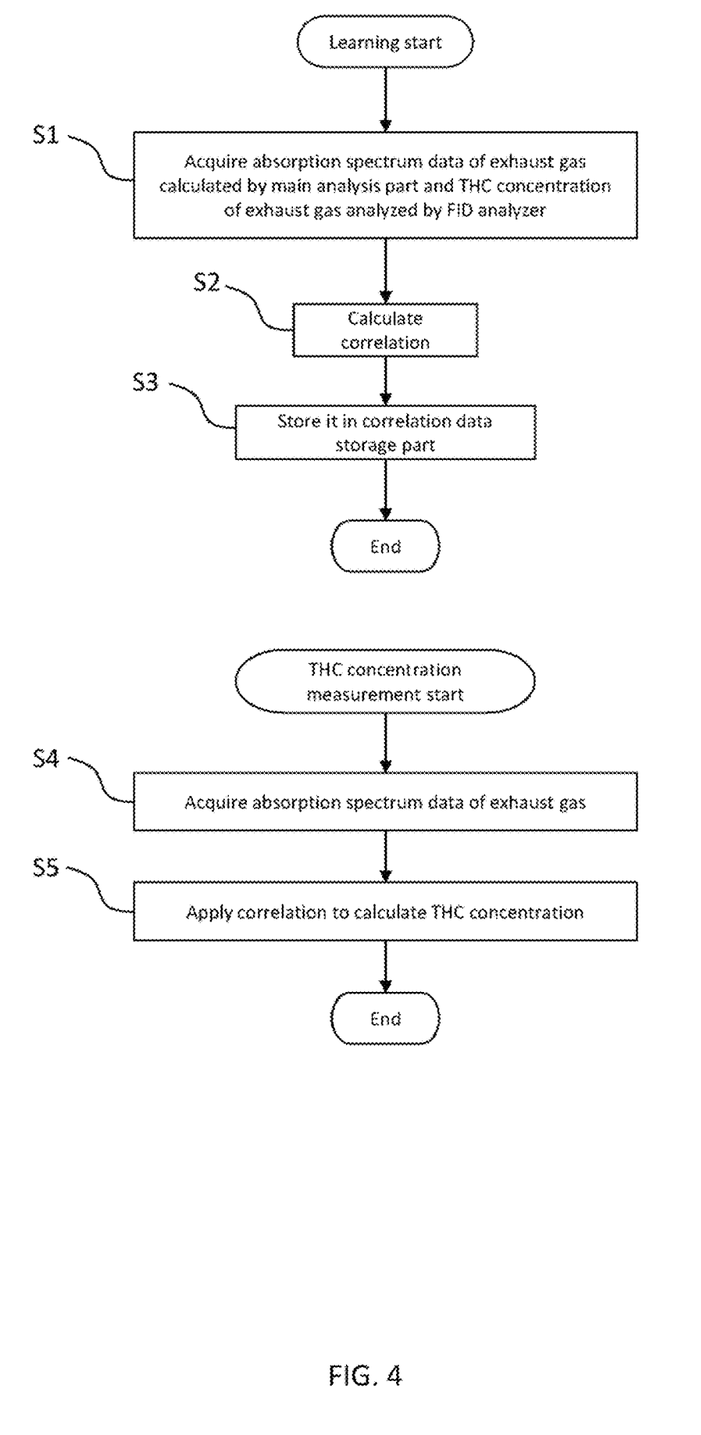
FIG. 4 is a flowchart illustrating the operation of the analyzer in the same embodiment.

Next, the operation of the exhaust gas measurement system 200 having such a configuration will be described with reference to FIG. 4.

First, learning is performed. For this purpose, a vehicle is driven on the chassis dynamometer 300, and a reference sample that is the exhaust gas of it is led to the FID analyzer 400 and the FTIR analyzer 100. In addition, without limitation to driving of a vehicle on the chassis dynamometer 300, an engine connected to an engine dynamometer may be driven, or a drivetrain component such as a transmission connected to a drivetrain dynamometer may be driven.

As a result, in the FID analyzer 400, THC concentration is measured, whereas in the FTIR analyzer 100, the absorption spectrum data of the exhaust gas is measured by the main analysis part 51.

In the present embodiment, the FID analyzer 400 and the FTIR analyzer 100 perform exhaust gas measurement (analysis), for example, synchronously at regular time intervals (a few msec to a few sec).

At every measurement, the reception part 53 acquires the absorption spectrum data of the exhaust gas calculated by the main analysis part 51 and the THC concentration of the exhaust gas analyzed by the FID analyzer 400, and successively stores them in the reference sample data storage part D1 as reference sample data (Step S1). At this time, the reception part 53 acquires the temperature and pressure of the exhaust gas, and attaches them to the reference sample data to store them in the reference sample data storage part D1.

Further, an engine state of the vehicle variously changes along with the time course from the start of driving and a variation in engine rotation speed, and correspondingly, a state (components, pressure, temperature) of the exhaust gas also successively changes, so that pieces of data of multiple reference samples of which at least THC concentrations are mutually different are obtained by the above-described successive measurement.

Then, the correlation calculation part 521 refers to many pieces of reference sample data stored in the reference sample data storage part D1 to calculate the correlation between absorption spectrum data and THC concentration, which is common to those pieces of reference sample data, by machine learning (Step S2), and the resulting correlation is stored in the correlation data storage part D2 (Step S3).

This ends the learning.

After the learning has been ended as described, actual THC concentration measurement using only the FTIR analyzer 100 can be performed. To perform the THC concentration measurement, another vehicle as a test target is mounted on the chassis dynamometer 300 and driven, and the exhaust gas of it is led to the FTIR analyzer 100. The FID analyzer 400 is adapted not to be introduced with the exhaust gas by closing an unillustrated valve of an exhaust gas introduction pipe, or other means, and the operation of the FID analyzer 400 is also stopped.

In the FTIR analyzer 100, the main analysis part 51 acquires the absorption spectrum data of the exhaust gas (Step S4). In doing so, the total analysis value calculation part 52 (calculation main body part 522) applies the correlation stored in the correlation data storage part D2 to the absorption spectrum data to calculate THC concentration (Step S5).

That is, the analyzer 100 configured as described is adapted to preliminarily obtain the correlation between the spectrum data and THC concentration of a reference sample, and on the basis of the correlation, directly calculate THC concentration from the spectrum data of a measurement sample, and since it is not that intermediate calculation such as calculating the analysis value of an individual component from spectrum data intervenes as conventional, an error and omission of information probably caused by the intermediate calculation can be eliminated to dramatically improve analysis accuracy.

Also, as long as a correlation is preliminarily obtained, it is not necessary to use the FID analyzer for THC concentration measurement, and therefore the need to use difficult-to-handle gases such as supporting gas ($H_2$) and inert gas (He) used for concentration adjustment of it is eliminated, making it possible to make contributions in terms of convenience and running cost as well.

Note that the present invention is not limited to the above-described embodiment.

For example, regarding the absorbance of THC, a measurement target contains moisture and other interference components, and therefore THC concentration may be adapted to be calculated on the basis of a corrected absorption spectrum in which the influence of them is reduced or eliminated. In doing so, the analysis accuracy is further improved.

In addition, in another embodiment, when calculating the correlation between absorption spectrum data and THC concentration, the correlation between absorption spectrum data and THC concentration may be calculated depending on THC concentration indicated by reference sample data.

Specifically, the correlation calculation part 521 may divide THC concentration into multiple (e.g., two or more) concentration divisions, calculate the correlation between absorption spectrum data and THC concentration for each of the concentration divisions, and store the resulting correlation data in the correlation data storage part D2. In this case, upon receipt of the absorption spectrum data of a measurement sample, the calculation main body part 522 may be adapted to, on the basis of the area or the like of the absorption spectrum data, select one piece of correlation data appropriate for the absorption spectrum data from among multiple pieces of correlation data stored in the correlation data storage part D2, and apply the selected correlation data to the spectrum data of the measurement sample to calculate the THC concentration of the measurement sample.

In such a configuration, since the correlation calculation part 521 calculates the correlation between absorption spectrum data and THC concentration for each of the concentration divisions, more highly accurate correlation data can be obtained. Further, the calculation main body part 522 calculates the THC concentration of the measurement sample using such highly accurate correlation data, and therefore the measurement accuracy can be more improved.

In addition, THC concentration is preferably divided into many more concentration divisions. In such a configuration, further highly accurate correlation data can be obtained.

In still another embodiment, when calculating the correlation between absorption spectrum data and THC concentration, the concentration of water contained in a reference sample may be set as a parameter.

Specifically, the reception part 53 may be configured to receive the concentration of water ($H_2O$) contained in a reference sample calculated by the individual component analysis part 512, and attach it to the data of the reference sample to store it in the sample data storage part D1. The correlation calculation part 521 may be adapted to refer to multiple pieces of reference sample data stored in the reference sample data storage part D1 and water concentrations attached to them, and to calculate the correlation between absorption spectrum data and THC concentration with the water concentration as a parameter. The calculation main body part 522 may be adapted to apply a correlation corresponding to the water concentration of a measurement sample when calculating THC concentration.

When measuring THC concentration by an FTIR, the interference influence and coexistence influence of water contained in exhaust gas may be problematic: however, in such a configuration, by using a correlation with water concentration as a parameter, the influence of water can be reduced when calculating the THC concentration of a measurement sample, making it possible to more improve the measurement accuracy.

Further, the above-described embodiment uses a correlation calculated by machine learning which directly connects spectrum data to THC concentration, but without depending on machine learning, may be adapted to calculate an arithmetic expression representing the relationship between the spectrum data and the THC concentration.

In this case, for example, the value of the spectrum data and the THC concentration is not directly connected, and an arithmetic expression (also a sort of correlation) representing the relationship between the analysis value (in this case, concentration) of each of individual HC components obtained from the spectrum data by the main analysis part 51 and the THC concentration is only required to be used.

A specific example of the arithmetic expression is as follows.

$$THC_{(R)} = a_1 \cdot HC_{1(R)} + a_2 \cdot HC_{2(R)} + \ldots \quad (1)$$

Here, $THC_{(R)}$ represents the THC concentration of a reference sample measured by the FID analyzer 400, $HC_{1(R)}$, $HC_{2(R)}$, ... represent the concentrations of respective hydrocarbons in the reference sample calculated by the main analysis part 51, and $a_1$, $a_2$, ... represent weighting factors.

In this case, multiple reference samples are analyzed to perform a multivariate analysis or the like, and optimum weighting factors $a_1$, $a_2$, ... satisfying Expression (1) above are determined. This is a function of the correlation calculation part 521.

Then, the concentrations of the respective hydrocarbons $HC_{1(R)}$, $HC_{2(R)}$, ... calculated by analyzing a measurement sample are substituted into Expression (2) below to calculate the THC concentration of the measurement sample. This is a function of the total analysis value calculation part 52.

$$THC_{(M)} = a_1 \cdot HC_{1(M)} + a_2 \cdot HC_{2(M)} + \ldots \quad (2)$$

Here, $THC_{(M)}$ represents the THC concentration of the measurement sample calculated by the total analysis value calculation part 52, and $HC_{1(M)}$, $HC_{2(M)}$, ... represent the concentrations of the respective hydrocarbons in the measurement sample calculated by the main analysis part 51.

Note that in the above example, a correlation is obtained using the multivariate analysis without depending on machine learning.

That is, to calculate a correlation, not only machine learning but expressions theoretically obtained as described above may be used.

In addition, machine learning and theoretical expressions can also be combined. For example, THC concentration may be adapted to be obtained such that for HC whose masses are small, individual concentrations are obtained using the main analysis part (i.e., by theoretical expressions), whereas for HC whose masses are large, total concentration is calculated by the correlation calculation part and the calculation main body part (i.e., by machine learning), and they are summed up.

Further, to calculate a correlation, not only values related to physical attributes of a sample, such as the temperature and pressure of the reference sample, but other pieces of surrounding situation data may be set as parameters. For example, engine combustion information (information related to supercharging, EGR, rich/stoichiometry/lean, laminar flow, uniform flow, direct injection, port injection, and the like), an engine head shape, ignition timing, a catalyst configuration, an oxygen amount in fuel, inorganic gas components, soot concentration, SOF concentration, an engine type, engine rotation speed, load information, a hot start, a cold start, oxygen concentration, catalyst temperature, gear ratio, and the like may be taken into account as parameters.

Contrary to this, all or part of the pieces of surrounding situation data are not set as parameters for correlation calculation, but pieces of surrounding situation data strongly influencing (i.e., highly related to) THC concentration (total analysis value) calculated and measured by the analyzers may be configured to be extracted.

By configuring in this manner, pieces of surrounding situation data having a high degree of relation to the THC concentration, i.e., design parameters can be grasped, and therefore an offer as a design development support system to automobile manufacturers and catalyst manufacturers becomes possible.

Depending on surrounding situation data used for a correlation, for example, in the case of a different engine type, relearning may have to be performed every time. In this respect, if it is possible to reduce the number of pieces of surrounding situation data to be taken into account and correlate spectrum data and THC concentration (total analysis value), versatility is further enhanced. Specifically, to calculate a correlation, surrounding situation data does not have to be taken into account at all, and an embodiment in which the physical state (e.g., pressure, temperature, refractive index, viscosity, and the like) of a sample itself are taken into account in the correlation calculation but other external attributes (e.g., an engine type, ignition timing, and the like) are not taken into account in the correlation calculation is also conceivable.

When as a surrounding situation for calculating a correlation, the temperature of a reference sample is set as a parameter, it is preferable that the outlet temperature of a tail pipe of a vehicle on the chassis dynamometer 300 is measured by a sensor or the like and the measured temperature is set as a parameter.

The range of spectrum data used for learning/analysis may be only a wavenumber range in which analysis target components are included, or may be expanded to a predetermined range exceeding it. Also, the wavenumber range of interference components may be excluded.

Specifically, the range of spectrum data used for learning/analysis may be set to be equal or more than 2800 cm$^1$ and equal or less than 3200 cm$^{-1}$.

In the case of such a spectrum data range, the wavenumber range of HC as analysis target components is included but the wavenumber range (approximately 3400 cm$^{-1}$ or more) of water as an interference component is excluded, and therefore the influence of water on calculating the THC concentration of a measurement sample can be reduced to more improve the measurement accuracy.

For HC whose molecular weights are small, respective concentrations may be obtained by the main analysis part 51, and the total concentration of one or more HC whose molecular weights are large may be calculated by subtracting from THC concentration.

Further, an analysis learning device that performs only correlation calculation may be configured by eliminating the function of the individual component analysis part from the present analyzer and introducing only a reference sample. A correlation obtained by this analysis learning device can be used in another FTIR analyzer.

The analyzer 100 in the above-described embodiment is one that calculates the correlation between the spectrum data and THC concentration of a reference sample by itself, but is not limited thereto. An analyzer 100 in another embodiment may be adapted to use a correlation preliminarily calculated by one other analysis learning device that performs only correlation calculation, and on the basis of the correlation, directly calculate THC concentration from the spectrum data of a measurement sample.

Figure 5:
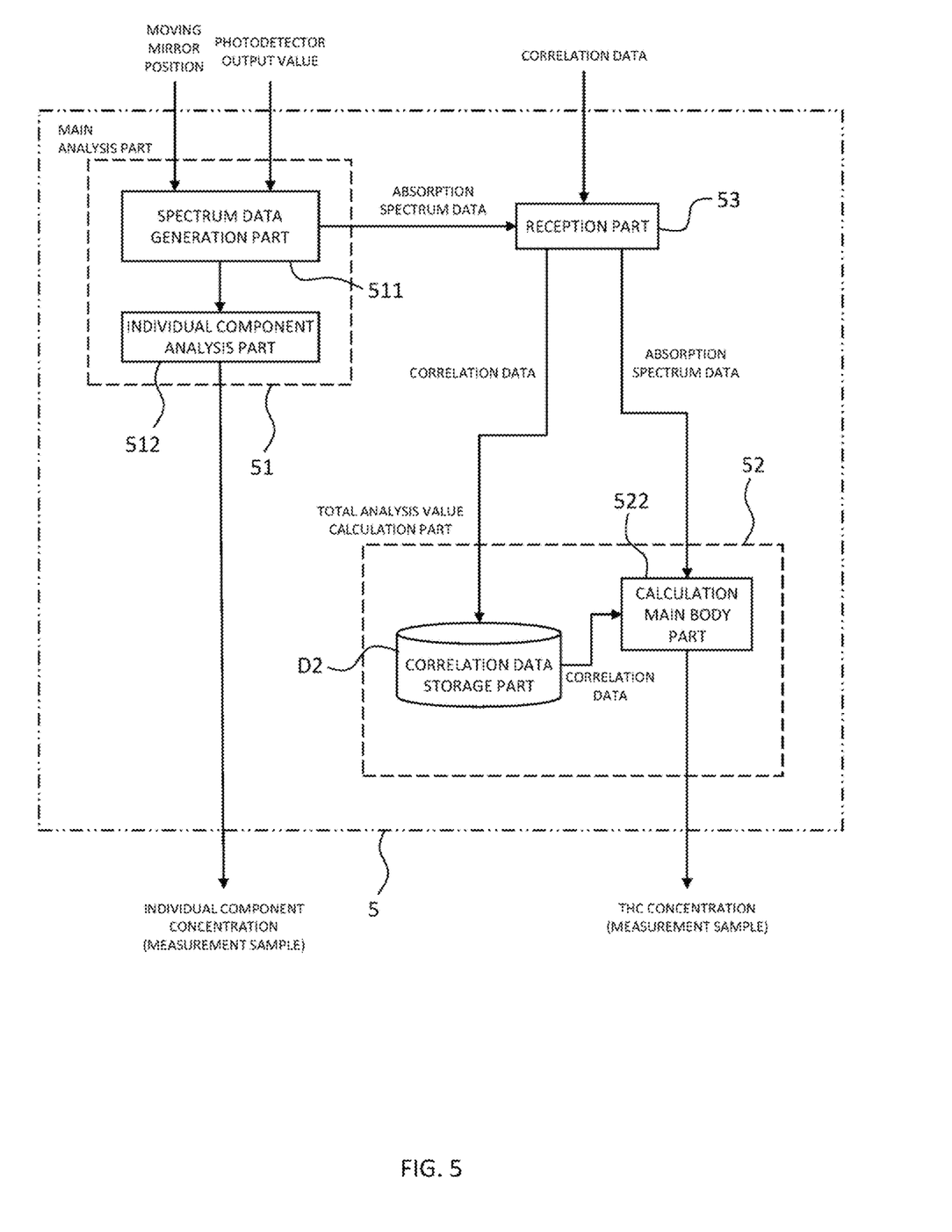
FIG. 5 is a functional block diagram of an arithmetic processing unit in another embodiment.

Specifically, as illustrated in FIG. 5, the analyzer 100 may be configured such that the arithmetic processing unit 5 does not have the functions as the reference sample data storage part D1 and the correlation calculation part 521. In this case, the reception part 53 may be adapted to receive correlation data (i.e., learned data) indicating the correlation preliminarily calculated by the one other analysis learning device via a network or the like, as well as preliminarily store it in the correlation data storage part D2. In addition, the calculation main body part 522 may be adapted to apply the correlation data preliminarily stored in the correlation data storage part D2 to the absorption spectrum data of a measurement sample and calculate the THC concentration of the measurement sample.

Further, the reception part 53 may be adapted to receive new correlation data from the one other analysis learning device at predetermined intervals, and regularly update the correlation data stored in the correlation data storage part D2.

A reference sample and a measurement target sample are exhaust gas in the above-described embodiment, but may be the atmosphere, another gas, or liquid.

Also, a reference sample does not have to be of the same type as a measurement sample, and standard gas produced by mixing multiple components serving as analysis targets with a main component such as nitrogen, or the like may be used. In this case, the total analysis value of the multiple components is known, and therefore it is not necessary to use another analyzer for analyzing the multiple components of the reference sample.

Further, components serving as analysis targets are not limited to HC but may be other components such as nitrogen oxides or dioxins.

As the analyzer, it is only necessary to be one that irradiates a measurement sample with light and performs analysis from the resulting spectrum, and NDIR is also applicable, or one other than a spectroscopic analyzer, such as a scattering type particle size distribution measurement apparatus is also applicable. Further, the present invention is not limited to analyzing the exhaust gas of a vehicle but can also analyze the exhaust gas of an internal combustion engine of a vessel, an aircraft, an agricultural machine, a machine tool, or the like.

Besides, it goes without saying that the present invention is not limited to the above-described embodiment but can be variously modified without departing from the scope thereof.

INDUSTRIAL APPLICABILITY

According to the present invention, in addition to analyzing a measurement sample using data related to a reference sample of which the total analysis value and spectrum data are known, an error caused by intermediate calculation such as calculating the analysis value of an individual component from spectrum data as conventional can be eliminated, and therefore analysis accuracy can be dramatically improved. Also, it is not necessary to use difficult-to-handle gases such as supporting gas (H$_2$), thus making it possible to make contributions in terms of convenience and running cost as well.

The invention claimed is:

1. An analyzer that analyzes a gaseous measurement sample on a basis of spectrum data obtained by irradiating the gaseous measurement sample with continuous light having a plurality of wave numbers, the analyzer comprising:
    a total analysis value calculation part that, on a basis of a total analysis value of a gaseous reference sample of which the total analysis value of multiple predetermined components are preliminarily obtained, calculates a total analysis value of the multiple components in the gaseous measurement sample from the spectrum data of the gaseous measurement sample, wherein the total analysis value of the gaseous reference sample is a quantitate property of the gaseous reference sample and wherein the total analysis value calculation part includes
        a correlation data storage part that stores data indicating a correlation, obtained using machine learning, between spectrum data of the gaseous reference sample and the total analysis value of the gaseous reference sample, wherein each spectrum of the spectrum data is a single spectrum containing contributions of all components in the gaseous reference sample, and
        a calculation main body part that applies the correlation in the correlation data storage part to the spectrum data of the gaseous measurement sample to calculate the total analysis value of the multiple components in the gaseous measurement sample.

2. The analyzer according to claim 1, wherein
the total analysis value calculation part further comprises
a correlation calculation part that, on a basis of the spectrum data of the gaseous reference sample and the total analysis value of the gaseous reference sample, calculates the correlation between the spectrum data and the total analysis value to store it in the correlation data storage part.

3. The analyzer according to claim 2, further comprising
a reception part that receives data indicating the total analysis value of the gaseous reference sample, the total analysis value being measured by one other type of analyzer, wherein
the correlation calculation part is one that calculates the correlation on a basis of the total analysis value received by the reception part and the spectrum data of the gaseous reference sample, the spectrum data being obtained by the analyzer.

4. The analyzer according to claim 2, wherein
the correlation calculation part is one that calculates the correlation from respective total analysis values and respective pieces of spectrum data of multiple gaseous reference samples, and when a total analysis value of a new reference sample and its spectrum data are acquired, takes into account the total analysis value of the new reference sample and its spectrum data to update the correlation.

5. The analyzer according to claim 1, wherein
the correlation is calculated with temperature and/or pressure of the gaseous reference sample as parameters, and
the calculation main body part calculates the total analysis value of the gaseous measurement sample on a basis of the correlation specified with temperature and/or pressure of the gaseous measurement sample as parameters.

6. The analyzer according to claim 5, wherein
the correlation is calculated with surrounding situation data related to an engine or a catalyst as a parameter, and
the calculation main body part calculates the total analysis value of the gaseous measurement sample on a basis of the correlation specified with the surrounding situation data related to the engine or the catalyst as a parameter.

7. The analyzer according to claim 1, wherein
the spectrum data is one in which an influence of another component interfering with the multiple components is reduced or removed.

8. The analyzer according to claim 1, further comprising
a main analysis part that analyzes an individual single component contained in the gaseous measurement sample on a basis of the spectrum data obtained by irradiating the gaseous measurement sample with the light.

9. The analyzer according to claim 1, wherein
the gaseous measurement sample or the gaseous reference sample is exhaust gas of a vehicle, and the components to be analyzed are hydrocarbons.

10. The analyzer according to claim 9, wherein
the total analysis value of the multiple predetermined components is concentration of total hydrocarbons contained in the exhaust gas.

11. The analyzer according to claim 1,
the analyzer being one of an FTIR type.

12. The analyzer according to claim 11, wherein
the one other type of analyzer is an FID analyzer.

13. An analysis method that analyzes a gaseous measurement sample on a basis of spectrum data obtained by irradiating the gaseous measurement sample with light, the analysis method comprising:
on a basis of a total analysis value of a gaseous reference sample of which the total analysis value of multiple predetermined components are preliminarily obtained, calculating a total analysis value of the multiple components in the gaseous measurement sample from the spectrum data of the gaseous measurement sample, wherein the total analysis value of the gaseous reference sample is a quantitate property of the gaseous reference sample;
storing data indicating a correlation, obtained using machine learning, between spectrum data of the gaseous reference sample and the total analysis value of the gaseous reference sample, wherein each spectrum of the spectrum data is a single spectrum containing contributions of all components in the gaseous reference sample; and
applying the correlation to the spectrum data of the gaseous measurement sample to calculate the total analysis value of the multiple components in the gaseous measurement sample.

14. The analysis method of claim 13, further comprising when a total analysis value of a new gaseous reference sample and its spectrum data are acquired, taking into account the total analysis value of the new gaseous reference sample and its spectrum data to update the correlation.

15. An analyzer that analyzes a gaseous measurement sample on a basis of spectrum data obtained by irradiating the gaseous measurement sample with continuous light having a plurality of wave numbers, the analyzer comprising:
a total analysis value calculation part that, on a basis of a total analysis value of a gaseous reference sample of which the total analysis value of multiple predetermined components are preliminarily obtained, calculates a total analysis value of the multiple components in the gaseous measurement sample from the spectrum data of the gaseous measurement sample, wherein the total analysis value of the gaseous reference sample is a quantitate property of the gaseous reference sample and wherein the total analysis value calculation part includes
a correlation data storage part that stores data indicating a correlation, obtained using machine learning, between spectrum data of the gaseous reference sample and the total analysis value of the gaseous reference sample, wherein each spectrum of the spectrum data is a single spectrum containing contributions of all components in the gaseous reference sample,
a calculation main body part that applies the correlation in the correlation data storage part to the spectrum data of the gaseous measurement sample to calculate the total analysis value of the multiple components in the gaseous measurement sample, and
a correlation calculation part that, on a basis of the spectrum data of the gaseous reference sample and the total analysis value of the gaseous reference sample, calculates the correlation from respective total analysis values and respective pieces of spectrum data of multiple gaseous reference samples to store it in the correlation data storage part, and when a total analysis value of a new gaseous reference sample and its spectrum data are acquired, takes into account the total analysis value of the new gaseous reference sample and its spectrum data to update the correlation.

* * * * *